9215X
J. Sweet,
Dressing Staves.
Patented Oct. 28, 1835.
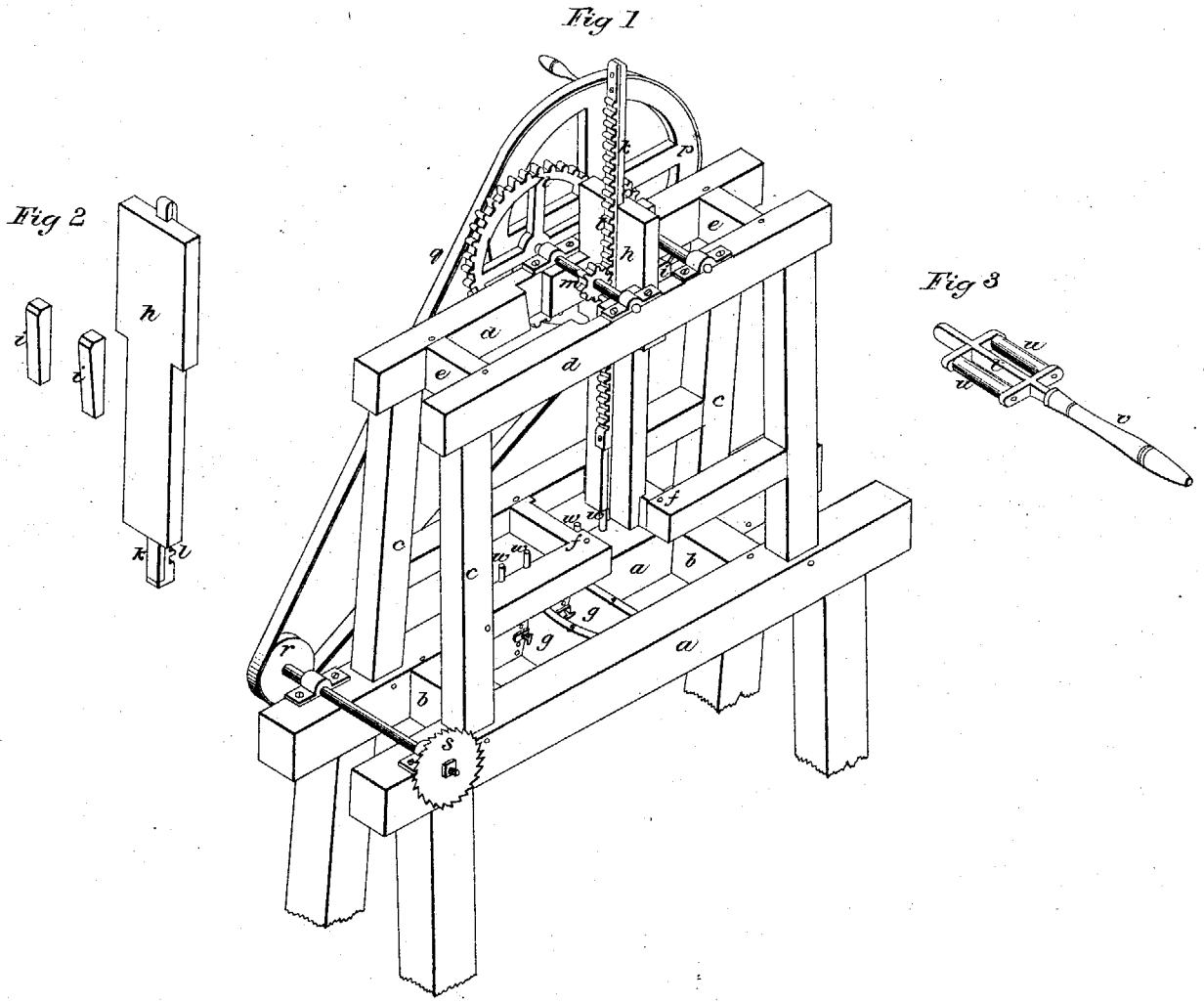
AM. PHOTO-LITHO. CO. N.Y. (OSBORNE'S PROCESS)

9215X Oct 28 1835 1.

Joseph Hurd of Muncy in Pennsylvania

Letters Patent

The Schedule referred to in these Letters Patent and making part of the same containing a description in the words of the said Joseph Hurd himself of his improvement in the machine for Dressing Staves.

Be it known that I Joseph Hurd of the Town of Muncy in the County of Lycoming and State of Pennsylvania; have made a new and useful improvement in the machine for dressing Staves, called Hurd's Portable Stave Dresser which is described as follows. This machine consists of the following parts. 1 The Frame. 2 The Knives or cutters. 3. The followers or drivers. 4 The Circles. 5. The gearing. 6 the Regulators or guiders. 7 The circular saw for listing and sawing off the ends of the staves. 1 The frame is made by first placing two sills about 6 feet long and 6 by 7 inches thick; these are placed from 7 to 10 inches apart and connected by cross pieces which are mortised and tenoned into them. Upon the sills are erected four posts about 3 by 4 inches thick, and of a length according to the kind of stave to be dressed, let into the sills by mortise and tenon; having their tops framed into long tenons to project above the plates with mortises in [illegible] to admit keys which secure the plates. Or the plates and sills may be secured by bolts and [illegible]. The plates are about 4 feet long 4 by 5 inches thick, secured to the tops of the posts as before described, and connected by cross ties. Between the posts are framed two short horizontal frames let into the posts by mortise and tenon to secure the guides hereafter described. Tables or platforms are constructed near the knives and saw to rest the staves and regulators upon 2nd The knives or cutters are made of good cast steel flat on their inner sides and are so placed that they may be brought nearer to or receded farther from each other at pleasure, according to the thickness of the staves required to be dressed; by means of a bolt and [illegible] at each end of the knives. They are placed facing at bottom. Between these knives the staves are to be forced by means of a follower or driver having cogs upon it. into which a pin-
ion works as hereinafter described. There are two setts of these Knives
placed parallel to each other in the sills and well secured by wedges
and Keys. 3d. The followers or drivers are made of wood, in length
according to the length of the stave to be dressed 3. by 5 inches thick
with cast iron racks let in the face of the same. These followers
work vertically between guides in grooves formed in the same to keep
the followers in their true position. 4. The guides are made of thick
plank having grooves on their inner sides for the followers to work
in and are secured at top between the plates by means of Keys. and
at bottom by the before described horizontal frames. Between these two
guides and followers is placed another guide secured by Keys & bolts
5.th The gearing consists of a cog wheel on the crank shaft about 4.
or 5 inches in diameter working into another cog wheel of about 2
feet in diameter upon the axis of which is a pinion 4 or 5 inches
diameter working into the racks of the followers or drivers which
work up and down between the guides. on the crank shaft is placed
a balance wheel of about 300 lbs weight to regulate the motion of the
machine. 6th The regulators or guides consist of small cast Iron
frames with rollers in them turning on gudgeons. which frames are
let into handles of wood. about four feet long and of suitable thickness
to give them strength and are used to guide the stave whilst being
forced thro' them between the Knives. the operator laying hold of the
handle and resting the end of the guides against a small iron pin or
projection in the sill which serves as a fulcrum whilst he brings the
roller against the stave and regulates it as it passes through between
the Knives. 7th A circular Saw for listing and sawing off the ends
of the Staves. is secured on an axle at the ends of. and across the frame
with a pulley on the same. around which a band passes to the ballance
wheel; when the saw is to be used, the small cog wheel on the balance-
wheel shaft is thrown out of gear by a sliding or shifting box in which it
turns. In the foregoing I have described a machine similar to one
which I have used, but the dimensions of the machine may be varied

[illegible] circumstances. Operation. The Stave to be dressed is place[d]
vertically over one set of knives, the crank handle is turned, which
[turn]s the balance wheel and the small cog wheel on its axle. This turns
large cog wheel which turns the pinion, this again working the
[rac]k and forces down the follower upon the stave in a perpendicular man[ner]
and forces it through between the knives and thus dresses it.
[A]t the same time the other rack and follower is raised, another stave is
[plac]ed over the other knives and the motion of the machine reversed, which
[fo]rces the second follower and forces the other stave thro the knives
[an]d dresses it in a similar manner as before described for the other fol[lower]
[an]d knives. When the staves are crooked or twisting the operato[r]
[gui]des them by the guides as before mentioned. This machine may [be]
turned by the power of a single man with ease. It may likewise [be]
[constru]cted so as to be operated by [a] horse or other power. It may also [be]
[us]ed for dressing spokes and heading.
[F]or a further illustration of my invention I refer to the model and
[draw]ing of the same deposited in the Patent Office.
[Wh]at I claim as my invention and not previously known in the above
[descr]ibed machine is the additional follower and the mode of [secur]ing
[th]e guides at bottom by the horizontal frames as before described.

Witnesses
G. T. Gibson
Sam. Stettinius
[illegible]

Joseph Guest (Drawing)

Patented 28th October 1835
Drawing made